E. H. DUKE & J. D. BROWN.
DEVICE FOR CONTROLLING ELECTRIC CURRENT.
APPLICATION FILED MAR. 8, 1917.
1,292,730.
Patented Jan. 28, 1919.
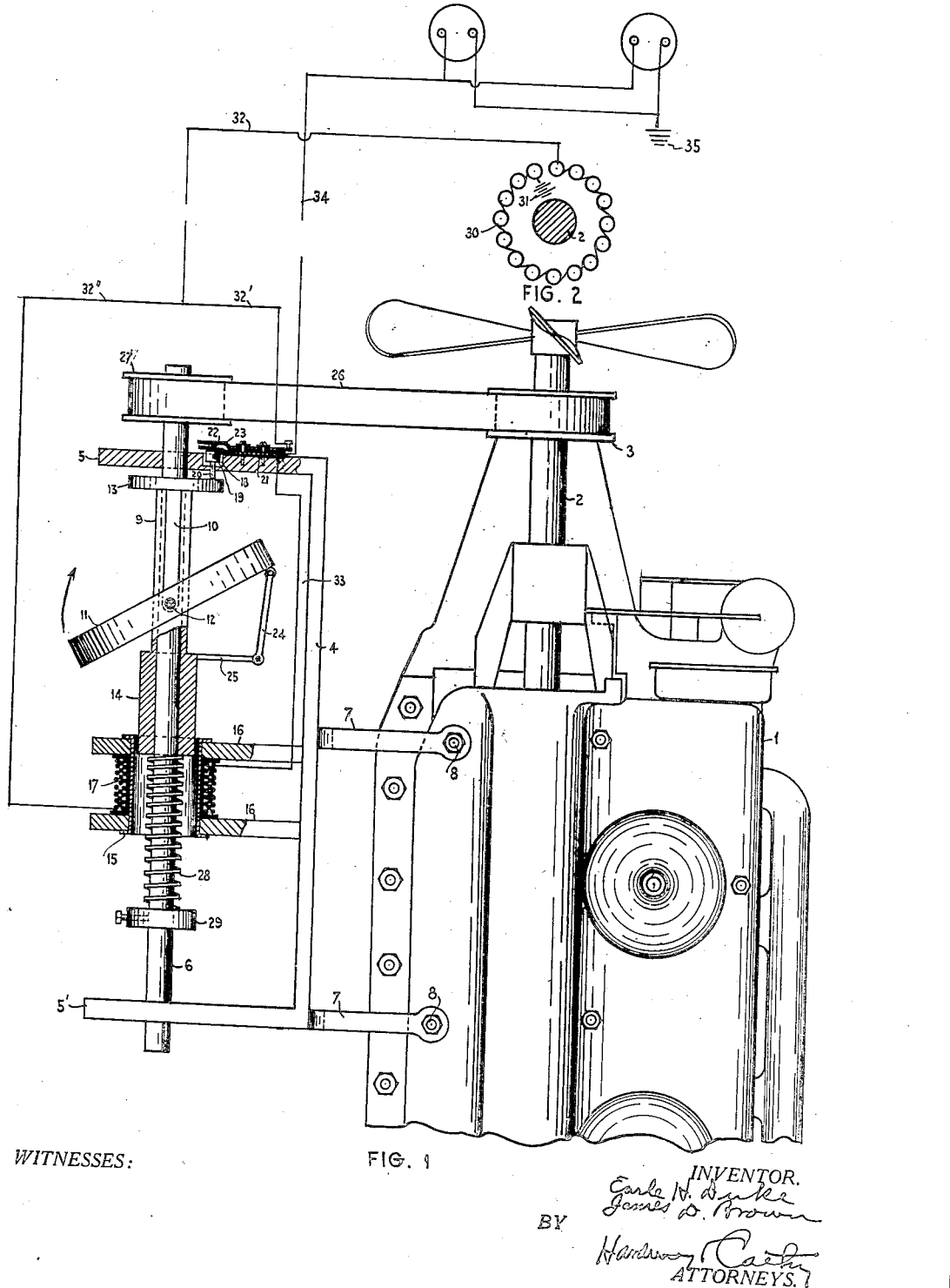

UNITED STATES PATENT OFFICE.

EARLE H. DUKE AND JAMES D. BROWN, OF HOUSTON, TEXAS.

DEVICE FOR CONTROLLING ELECTRIC CURRENT.

1,292,730. Specification of Letters Patent. Patented Jan. 28, 1919.

Application filed March 8, 1917. Serial No. 153,398.

*To all whom it may concern:*

Be it known that we, EARLE H. DUKE and JAMES D. BROWN, citizens of the United States, residing at Houston, in the county of Harris and State of Texas, have invented certain new and useful Improvements in Devices for Controlling Electric Current, of which the following is a specification.

This invention relates to new and useful improvements in a device for controlling electric current.

The object of the invention is to provide a device of the character described whereby the current from an electrical generator may be controlled.

This device has been designed particularly for use on automobiles for controlling the flow of electrical current through the lights and whereby, when the motor is running at normal speed, the lights will receive practically full voltage from the generator, but when the motor is running fast, the current will be automatically impeded to prevent the burning out of the lights by reason of too strong a current.

With the above and other objects in view, the invention has particular relation to certain novel features of construction, operation and arrangement of parts, an example of which is given in this specification and illustrated in the accompanying drawings, wherein:—

Figure 1 is a fragmentary plan view of a motor, showing the device, partially in section, and connected to said motor, and Fig. 2 shows a diagrammatic view of the magneto electrically connected, in multiple with the lights.

Referring now more particularly to the drawings wherein like numerals of reference designate similar parts in each of the figures, the numeral 1 refers to the motor having the motor shaft 2, with the pulley 3 fixed thereon. A frame 4 is provided, having the end bearings 5, 5', wherein the shaft 6 rotates. The frame is fixed in relation to the motor by means of the hangers 7, 7, which are integral with the frame, and which are secured to the motor by means of the bolts 8, 8. Slidably mounted upon the shaft 6 is the sleeve 9 having an oblong slot as 10 cut therethrough and a ring 11 is pivotally mounted relative to the shaft 6 by means of a rod 12 which extends through the slot 10 and the shaft 6, said rod being fixed relative to the shaft 6 and its respective ends having bearings in said ring 11 so that the ring will pivot on said rod. The end of the sleeve 9 adjacent the bearing 5 has the disk 13 fixed thereon and the opposite end of said sleeve is enlarged and formed into a plug 14, adapted to move into, and out of, the lining 15 and to fit loosely in said lining. This lining is a spool shaped brass carried by the free ends of the supporting arms 16, 16, which are spaced apart and integral with the frame 4. Surrounding this brass and insulated therefrom, and also insulated from the arms 16 is the variable inductance coil 17 commonly known as a choke coil. The outer side of the bearing 5 has a socket 18 in which is seated the plug 19, said plug having an extended pin 20 which projects through an orifice in the bottom of the socket 18 and whose free end normally rests against the disk 13. A tongue 21 is secured at one end to the outer side of the bearing 5 and insulated therefrom, and its other end is free and rests against the plug 19 normally holding said plug seated in the socket 18 and said free end is also provided with a contact point 22, arranged to be brought into and out of contact with the free end of the tongue 23, this last mentioned tongue being insulated from the frame 4. A link 24 is pivoted at one end to one side of the ring 11 and at its other end is pivotally connected to the arm 25 which projects out from the plug 14. When the motor is running, rotation is imparted to the shaft 6 through the belt 26 which operates over the pulley 3 and the pulley 27 fixed on the shaft 6. As the motor speeds up, the plane of rotation of the ring 11 gradually approaches a right angular position, relative to the shaft 6 operating through the link 24 to move the sleeve 9 and plug 14 along the shaft 6 and seating said plug in the lining 15. When the disk 13 is thus moved out of contact with the pin 20, the free end of the tongue 21 carries the contact point 22 out of contact with the tongue 23. When the engine slows down, the plug 14 is moved out of the lining 15 on account of the resistance of the coil spring 28 which surrounds the shaft 6 and is interposed between the plug 14 and the adjustable collar 29. This last mentioned collar may be adjusted on the shaft 6 so as to regulate the tension of said spring against the plug 14. The influence of the spring 28 will move the sleeve 9 back until the disk 13 again contacts with the pin 20 and forces the contact point 22 into contact with the tongue 23. The numeral 30 refers to the magneto which is driven by the engine shaft 2. This magneto is grounded at the point 31 and from it leads the electrical current conducting wire 32 which separates, one branch, 32', being connected to the tongue 23, and the other branch 32" being connected to the variable reactance coil 17. This coil is also connected to the tongue 21 through the electrical current conductor 33. The tongue 21 is also connected, in multiple, with the lights through the electrical current conductor 34 which is grounded at the point 35.

At slow motor speed, the tongues 21 and 23 are in contact through the contact point 22 and the current passes from the magneto through the conductors 32, 32', the tongues 23 and 21 and through the lights, through the conductor 34, and is grounded at the point 35, thus following the path of least resistance and practically full voltage is thus given to the lights. As the speed of the motor increases, the ring 11 approaches a plane at right angles to the shaft 6 carrying the disk 13 out of contact with the pin 20 and the flexibility of the free end of the tongue 21 carries the point 22 out of contact with the tongue 23 and the electrical current is sent from the electrical current conductor 32 through the conductor 32" and through the coil 17 and thence through the electrical conductors 33 and 34 through the lights. The electrical current is thus impeded by said coil, preventing too strong a current from passing through the lights and burning them out. As the speed of the motor increases, this impedance is increased by reason of the fact that the plug 14 is moved farther and farther into the lining 15, thus increasing the magnetic resistance and setting up a counter electro-motive force. The arms 16, 16, form, with the frame 4, the ordinary horse shoe magnet and the farther the plug 14 moves into the lining 15 the greater the magnetic flux and, consequently the greater the electrical impedance so that the electrical impedance is increased in proportion as the motor speed increases and as the voltage created by the magneto increases, and vice versa.

What we claim is:

A device of the character described including a motor, an electrical current generator driven thereby, a supporting member, an electrical current conductor connected with the generator and formed into a variable reactance coil supported by said member, a movable contact point connected to said conductor, a fixed contact point opposing said movable contact point, said fixed point also being connected to said electrical conductor, a rotatable shaft driven by the motor, a sleeve mounted thereon, a member actuated by the sleeve and normally operating against and holding the movable contact point in contact with the fixed contact point, thereby short circuiting the variable reactance coil, a yieldable member, operating against the sleeve to hold said points in contact, and a mechanism operated by the shaft and operatively connected with the sleeve whereby the position of said sleeve is varied, relative to the variable reactance coil, as the speed of the motor varies, said mechanism operating when the shaft has reached a predetermined speed of rotation, to overcome said yieldable member and release said yieldable contact point to permit the separation of said points, thereby cutting said reactance coil into said current conductor.

In testimony whereof we have signed our names to this specification in the presence of two subscribing witnesses.

EARLE H. DUKE.
JAMES D. BROWN.

Witnesses:
E. V. Hardway,
F. A. Liddell.